United States Patent
Takahashi (10) Patent No.: US 8,136,356 B2
(45) Date of Patent: Mar. 20, 2012

(54) SHAPE MEMORY ALLOY ACTUATOR SYSTEM

(75) Inventor: Masaya Takahashi, Hachioji (JP)

(73) Assignee: Olympus Corporation, Tokyo (JP)

(*) Notice: Subject to any disclaimer, the term of this patent is extended or adjusted under 35 U.S.C. 154(b) by 536 days.

(21) Appl. No.: 12/481,020

(22) Filed: Jun. 9, 2009

(65) Prior Publication Data

US 2009/0301077 A1    Dec. 10, 2009

(30) Foreign Application Priority Data

Jun. 9, 2008    (JP) .................. 2008-150349

(51) Int. Cl.
*F01B 29/10* (2006.01)
*F02G 1/04* (2006.01)
*H05B 1/02* (2006.01)

(52) U.S. Cl. ............. 60/527; 60/528; 219/497; 219/504

(58) Field of Classification Search ............ 60/527–529; 219/497, 499, 504, 505; 373/101, 102, 137
See application file for complete search history.

(56) References Cited

U.S. PATENT DOCUMENTS 6,434,932 B2* 8/2002 Hara et al. ............ 60/527
6,945,045 B2* 9/2005 Hara et al. ............ 60/527

FOREIGN PATENT DOCUMENTS

JP    7-274561    10/1995

* cited by examiner

*Primary Examiner* — Thomas Denion
*Assistant Examiner* — Christopher Jetton
(74) *Attorney, Agent, or Firm* — Scully, Scott, Murphy & Presser, P.C.

(57) ABSTRACT

A resistance feedback circuit has a storage section which stores a feedback gain calculated in advance, a resistance value obtained from a detection section, and a time at which the resistance value is obtained. A computing section has a gain setting section which calculates an amount of change in a resistance value in a predetermined time from the resistance value and the time stored in the storage section, and calculates the feedback gain based on the change in the resistance value calculated, and replaces the feedback gain which is calculated in advance.

5 Claims, 9 Drawing Sheets

SHAPE MEMORY ALLOY ACTUATOR SYSTEM

CROSS-REFERENCE TO RELATED APPLICATION

The present application is based upon and claims the benefit of priority from the prior Japanese Patent Application No. 2008-150349 filed on Jun. 9, 2008; the entire contents of which are incorporated herein by reference.

BACKGROUND OF THE INVENTION

1. Field of the Invention

The present invention relates to a shape memory alloy actuator system which includes a shape memory alloy actuator.

2. Description of the Related Art

A shape memory alloy undergoes a phase transition (phase change) due to a change in a temperature, and has a change of shape. An actuator in which, the shape change of the shape memory alloy is used is superior in characteristics such as a small size and a light weight. For instance, an actuator described in Japanese Patent Application Laid-open Publication No. Hei 7-274561 is available as a conventional example of an actuator in which a shape memory alloy is used. In the actuator described in Japanese Patent Application Laid-open Publication No. Hei 7-274561, the shape is changed by adjusting a heating and a cooling of the shape memory alloy by adjusting a supply of an electric power to the shape memory alloy. Moreover, the shape change of the shape memory alloy is controlled by controlling a feedback by using a resistance value which changes with the shape change. In Japanese Patent Application Laid-open Publication No. Hei 7-274561, a technology in which the actuator functions as a sensor by carrying out a resistance feedback control has been disclosed.

However, in a shape memory alloy actuator, in a case of carrying out a control of a mobile object of the actuator by controlling an amount of electric power supplied to the shape memory alloy by the feedback control, a value of a feedback gain is strongly affected by a position controllability and a response speed of the mobile object which is coupled with the shape memory alloy. Furthermore, when a use environment of the actuator is changed, there is a possibility that the optimum feedback gain changes according to use due to a change in an external temperature around the actuator and a wearing out of constituent members. Therefore, for carrying out a stable control every time, it is desirable to carry out the control by the optimum feedback gain according to the use. However, the actuator described in Japanese Patent Application Laid-open Publication No. Hei 7-274561 is not capable of coping with this point.

SUMMARY OF THE INVENTION

The present invention is made in view of the abovementioned problem, and an object of the present invention is to provide a shape memory alloy actuator system which is capable of coping with a position controllability, a response speed of a mobile object coupled with the shape memory alloy, and other characteristics, and a change in a use environment of the actuator.

To solve the abovementioned problems and to achieve the object, according to the present invention there can be provided a shape memory alloy actuator system including a shape memory alloy actuator which moves a mobile object installed on a shape memory alloy wire by making the shape memory alloy wire contract by heating by supplying an electric power at a time of heating, and by making the shape memory alloy wire elongate by a bias applying member to which bias is applied, resisting in a direction of contraction at a time of cooling, and a resistance feedback circuit, and the resistance feedback circuit includes a detection section which detects a resistance value of the shape memory alloy wire at the time of contraction and elongation of the shape memory alloy actuator, a computing section which carries out a comparison operation of comparing a resistance value obtained from the detection section with a resistance value input by a command section, and calculates a value of an electric current to be applied according to the resistance value which is detected, and output section which outputs to the shape memory alloy actuator the value of the electric current applied which is output from the computing section, a control section which controls the detection section, and the computing section, and the output section, and the resistance feedback circuit further includes a storage section which stores a feedback gain which is calculated in advance, a resistance value which is acquired from the detection section, and a time at which the resistance value is acquired, and the computing section includes a gain setting section which calculates an amount of change in the resistance value in a predetermined time from the time and the resistance value stored in the storage section, and calculates the feedback gain based on the change in the resistance value calculated, and replaces the feedback gain which is calculated in advance.

In the shape memory alloy actuator system according to the present invention, it is preferable that the feedback gain which is calculated in advance is calculated based on a change in the resistance value in the predetermined time which is acquired at a time of manufacturing the shape memory alloy actuator system.

In the shape memory alloy actuator system according to the present invention, the gain setting section can calculate the feedback gain based on a change in the resistance value in the predetermined time which is acquired at the time of putting ON a power supply of the shape memory alloy actuator.

In the shape memory alloy actuator system according to the present invention, the feedback gain setting section may set the feedback gain at a predetermined time interval after putting ON a power supply of the shape memory alloy actuator.

In the shape memory alloy actuator system according to the present invention, it is preferable that the shape memory alloy actuator system further includes a sensor section which detects an ambient temperature of the shape memory alloy actuator, and when a temperature change portion detected at the predetermined interval by the sensor section, after putting the power supply ON, is beyond a predetermined temperature range, the feedback gain setting section calculates the feedback gain.

BRIEF DESCRIPTION OF THE DRAWINGS

FIG. 2A and FIG. 2B are partial cross-sectional views showing a structure of a shape memory alloy actuator system according to the embodiment of the present invention, where.

DETAILED DESCRIPTION OF THE INVENTION

An embodiment of a shape memory alloy actuator system according to the present invention will be described below in detail by referring to the accompanying diagrams. However, the present invention is not restricted to the embodiment described below.

Figure 1:
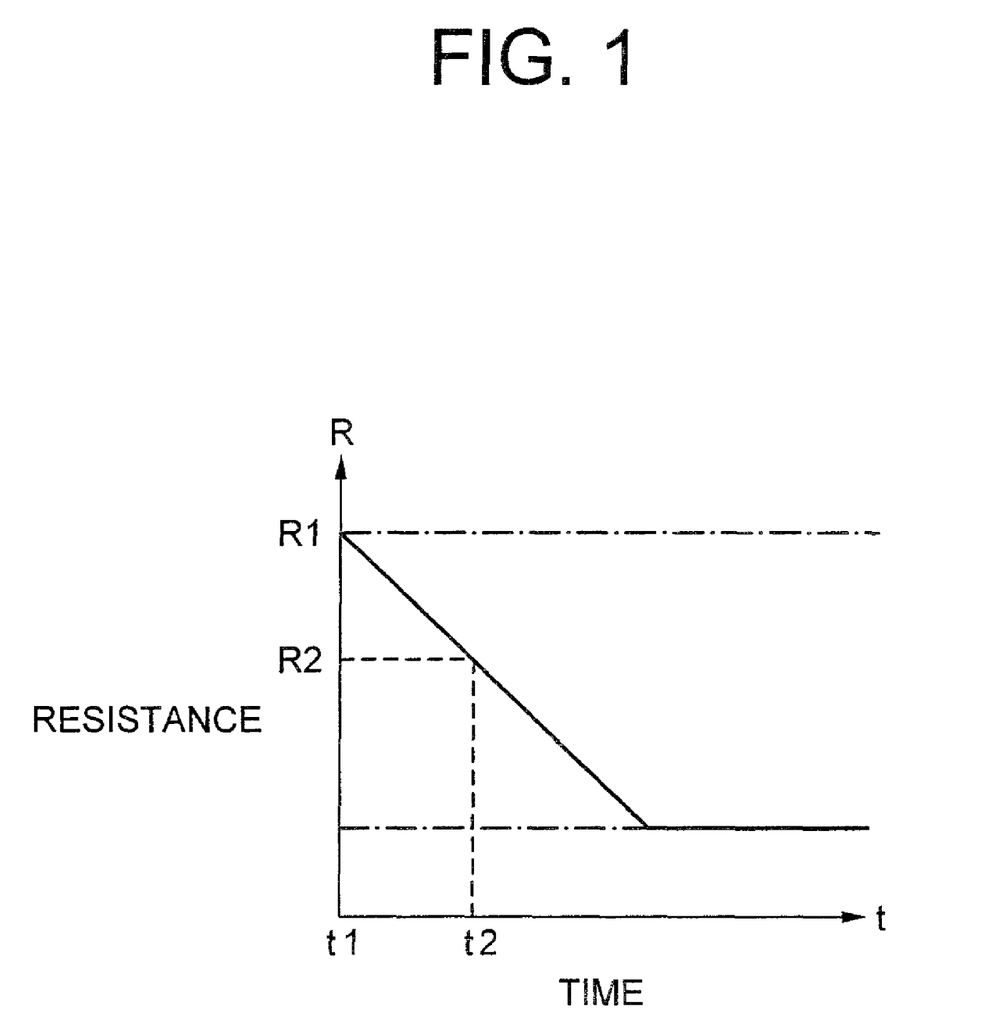
FIG. 1 is a graph showing resistance characteristics of a shape memory alloy wire (hereinafter, 'SMA wire') according to an embodiment of the present invention.

FIG. 1 is a graph in which a time (a horizontal axis) and a resistance value (a vertical axis) when a SMA wire 16 (shape memory alloy wire) (FIG. 2A and FIG. 2B) used in the embodiment is being heated at a constant electric power is shown. A resistance between both ends of the SMA wire 16 at time t1 is let to be R1, and similarly, a resistance between both ends of the SMA wire 16 at time t2 is let to be R2. The graph is a state in which the SMA wire 16 is being heated, and shows that a length contracts due to a phase transformation of the SMA wire 16, and with elapsing of time, the resistance value is decreased.

Figure 2A:
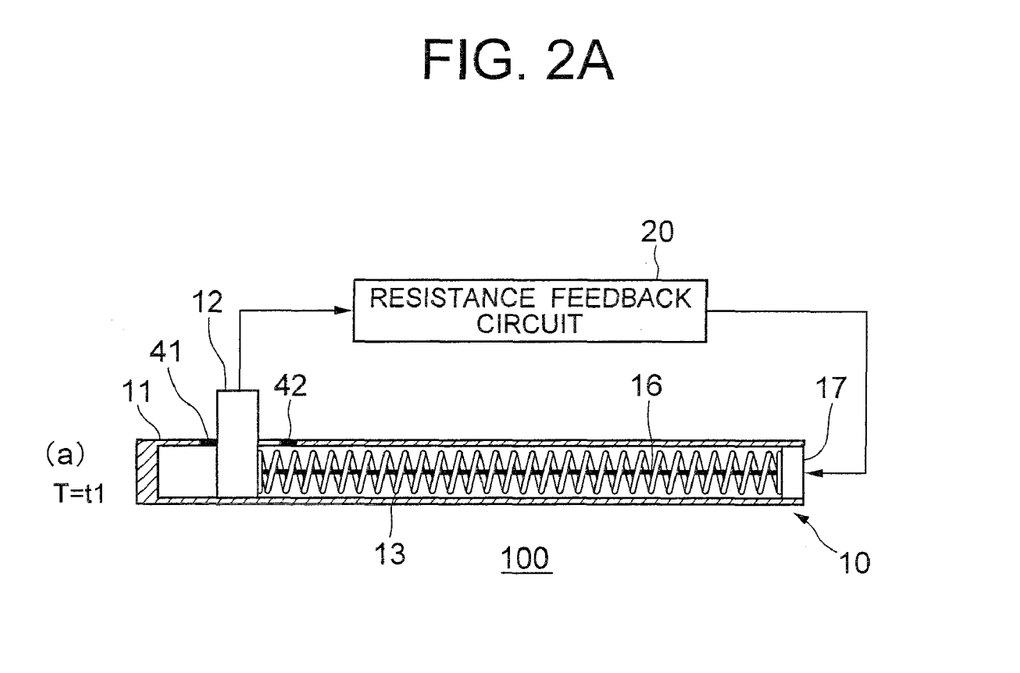
FIG. 2A is a diagram showing a state at a time t1 in FIG. 1.
Figure 2B:
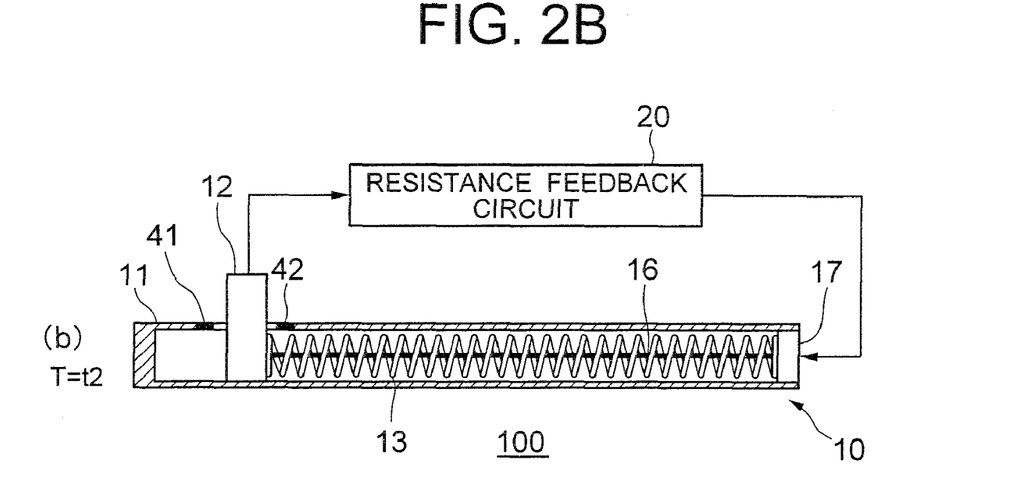
FIG. 2B is a diagram showing a state at time t2 in FIG. 1.

FIG. 2A and FIG. 2B are partial cross-sectional views showing an embodiment of a shape memory alloy actuator system 100 in which the SMA wire 16 shown in FIG. 1 is used. FIG. 2A shows a state of the SMA wire 16 at time t1 shown in FIG. 1, and FIG. 2B shows a state of the SMA wire 16 at time t2.

The shape memory alloy actuator system 100 includes a shape memory alloy actuator 10 and a resistance feedback circuit 20. The SMA wire 16 disposed inside a cylinder 11 of the shape memory alloy actuator 10 is connected to the resistance feedback circuit 20, and a constant electric power is supplied by the resistance feedback circuit 20. A lower portion of a mobile object 12, a bias spring 13 (a bias applying member), and the SMA wire 16 are disposed inside the cylinder 11.

The bias spring 13 and the SMA wire 16 are disposed to be extended in an axial direction of the cylinder 11, and one end portion thereof is fixed to the mobile object 12 and the other end portion thereof is fixed to a bottom wall 17 of the cylinder 11. The fixing is carried out by adhering. The bias spring 13, in a state of the SMA wire 16 contracted (state in FIG. 2B), by an elastic force thereof, applies bias such that the mobile object 12 regains its original position (state in FIG. 2A), or in other words, makes a contact with a first regulating member 41. In the shape memory alloy actuator system 100, when the fixed electric power is supplied from the resistance feedback circuit 20 to the SMA wire 16, the SMA wire 16 contracts due to heating by supplying the electric power. Accordingly, the mobile object 12 moves resisting the elastic force of the bias spring 13, and stops upon making a contact with a second regulating member 42 (rightward direction in FIG. 2A and FIG. 2B).

An amount of movement of the mobile object 12 changes due to an ambient temperature around the shape memory alloy actuator 10 or the shape memory alloy actuator system 100 use environment such as friction between the mobile object 12 and the cylinder 11, and there is a possibility that a position of the mobile object 12 at time t2 changes. When the amount of movement of the mobile object 12 when the fixed electric power is supplied at a fixed time interval differs, since a difference in the amount of movement reflects a difference in a gain value necessary for that system, when a resistance feedback control is carried out by the resistance feedback circuit 20, the optimum feedback gain can be said to differ.

Figure 3:
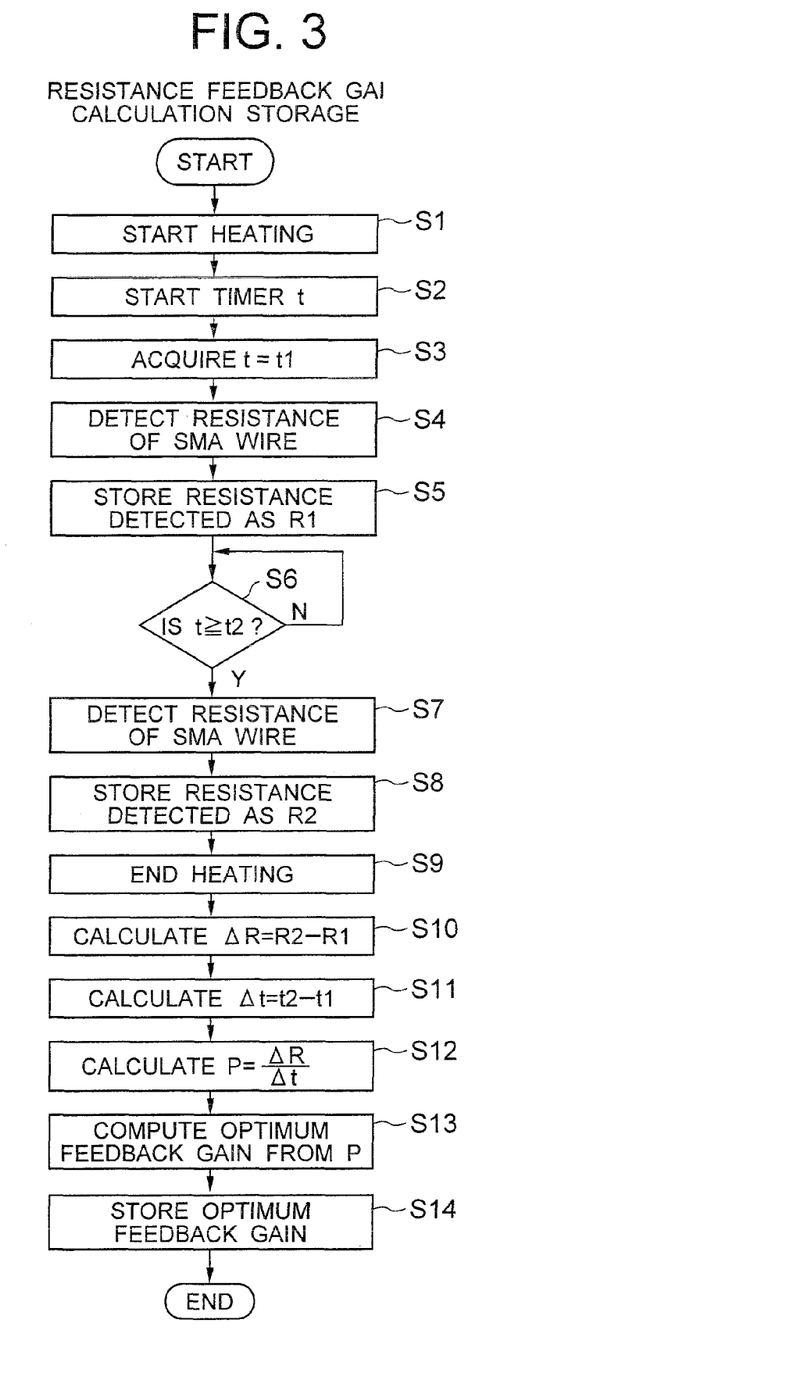
FIG. 3 is a flowchart showing a procedure for a resistance feedback gain calculation storage carried out by a resistance feedback circuit according to the embodiment.
Figure 6:
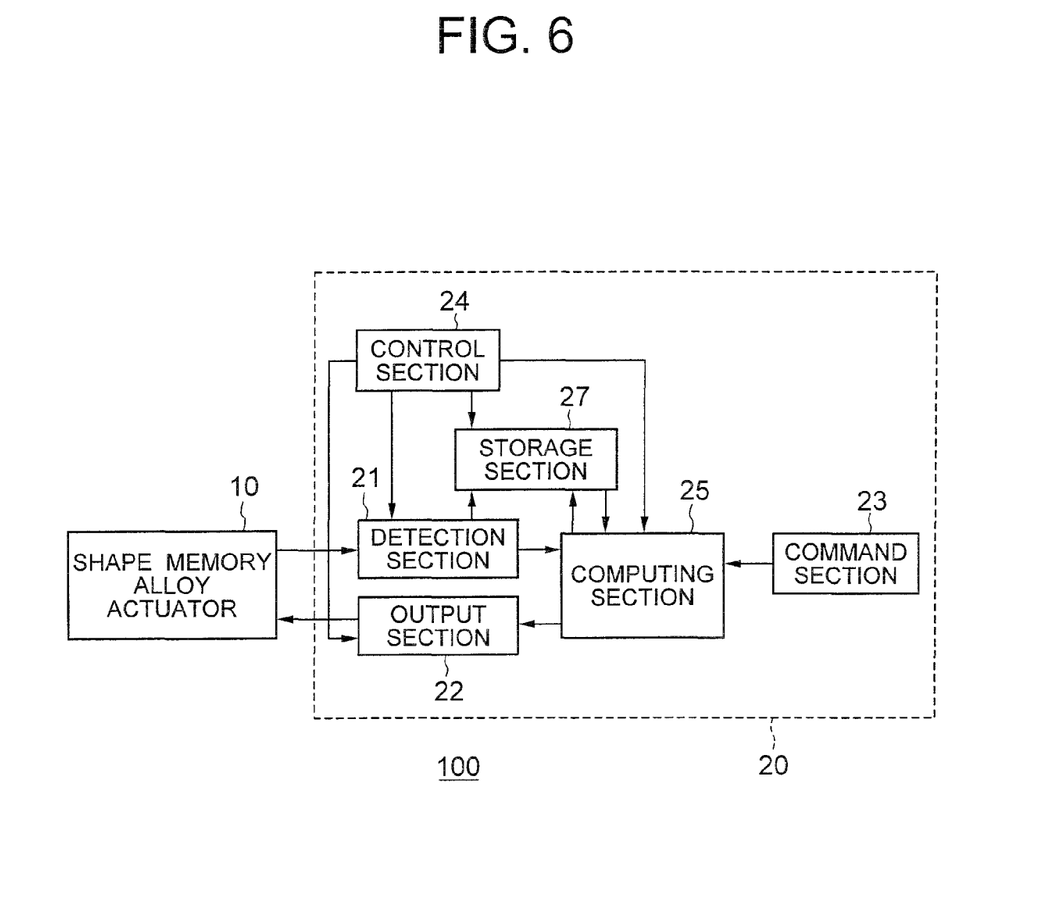
FIG. 6 is a block diagram showing a structure of the shape memory alloy actuator system according to the embodiment of the present invention, and is a diagram in which, a structure of the resistance feedback circuit is shown in detail.
Figure 7:
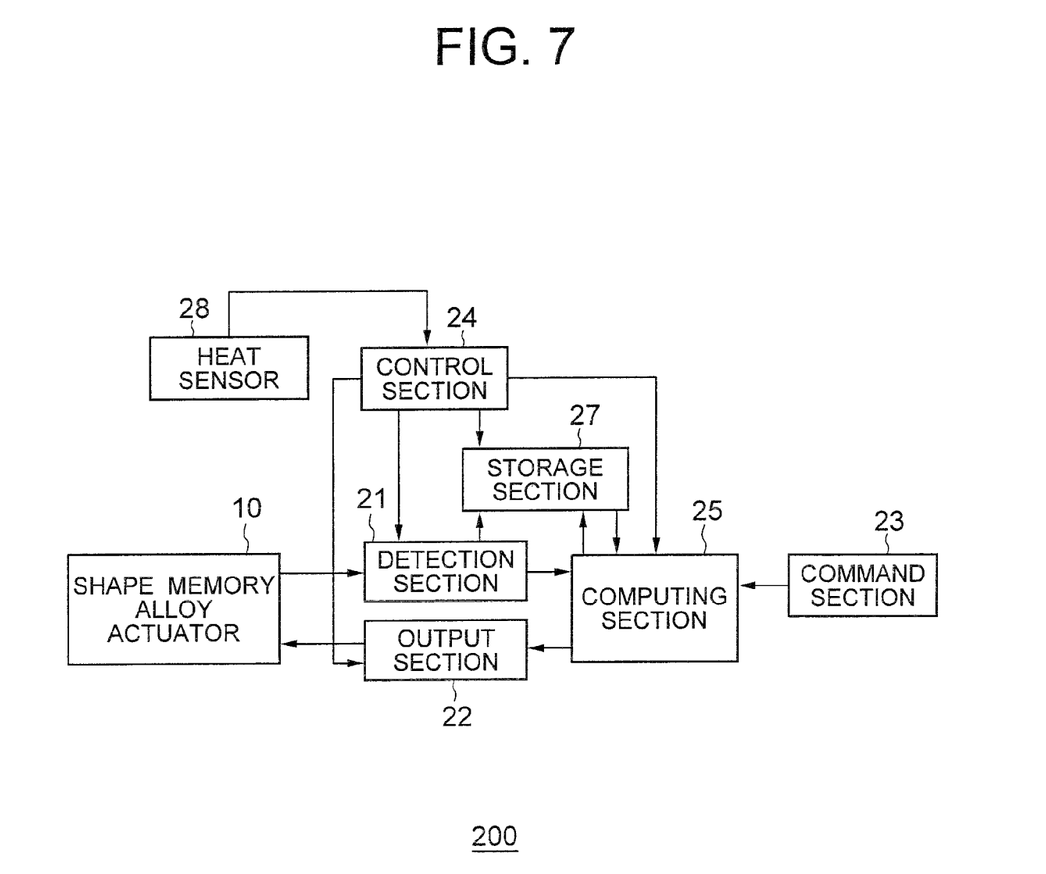
FIG. 7 is a block diagram showing a structure of a shape memory alloy actuator system according to a modified embodiment of the embodiment of the present invention.
Figure 8:
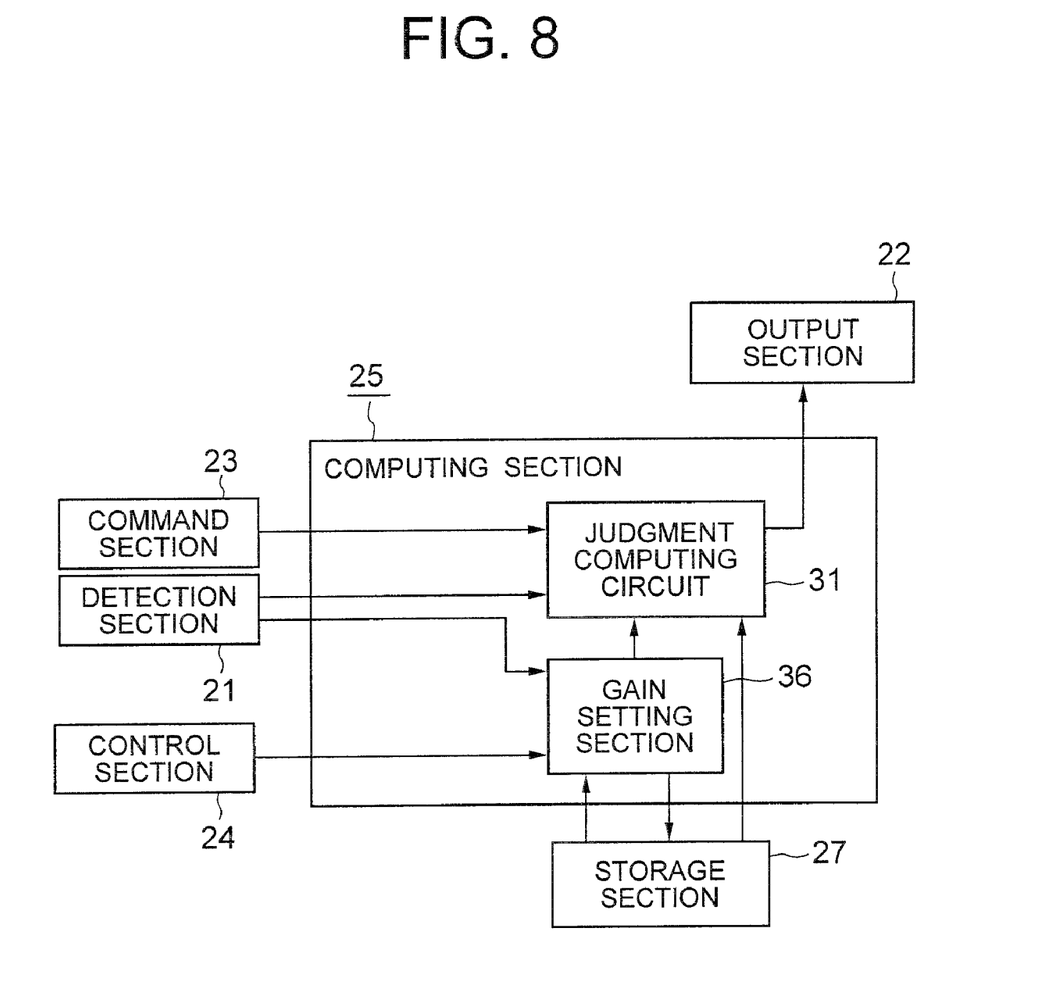
FIG. 8 is a block diagram showing a structure of the resistance feedback circuit according to the embodiment of the present invention, and is a diagram in which, a structure of computing section is shown in detail.

Next, a procedure for a resistance feedback gain calculation storage carried out by the resistance feedback circuit 20 will be described below by using FIG. 3. Here, FIG. 3 is a flowchart showing the procedure for the resistance feedback gain calculation storage carried out by the resistance feedback circuit 20 shown in FIG. 2A and FIG. 2B. This procedure shows the procedure for the resistance feedback gain calculation storage (step S100) shown in FIG. 4 which will be described later. A structure inside the resistance feedback circuit 20 will be described later (FIG. 6, FIG. 7, and FIG. 8).

With the structure of the shape memory alloy actuator system 100 shown in FIG. 2A and FIG. 2B, at the time of starting the use, a supply of a constant electric power is started to the SMA wire 16 (step S1). Next, a counter of a timer is started (step S2) and start of the time is let to be t=t1 (step S3). A resistance value of the SMA wire 16 when t=t1 is detected (step S4), and the resistance value detected is stored as R1 (step S5). A judgment of whether time t is t2 or more is made (step S6), and when the time t is judged to be more than t2, (YES at step S6), the process advances to the next step (step S7). On the other hand, when t is less than t2 (NO at step S6), a comparative judgment of t and t2 (step S6) is repeated till t becomes t2 or more.

When t is judged to be t2 or more (YES at step S6), the resistance value of the SMA wire 16 is detected (step S7). The resistance value detected is stored as R2 (step S8) and the supply of the constant electric power to the SMA wire 16 is stopped (step S9). Next, R2−R1 is calculated as ΔR (step S10), and t2−t1 is calculated as Δt (step S11). P=ΔR/Δt is calculated as a factor which determines the feedback gain (step S12), and the optimum feedback gain is calculated from the value P (step S13), and stored (step S14).

Figure 4:
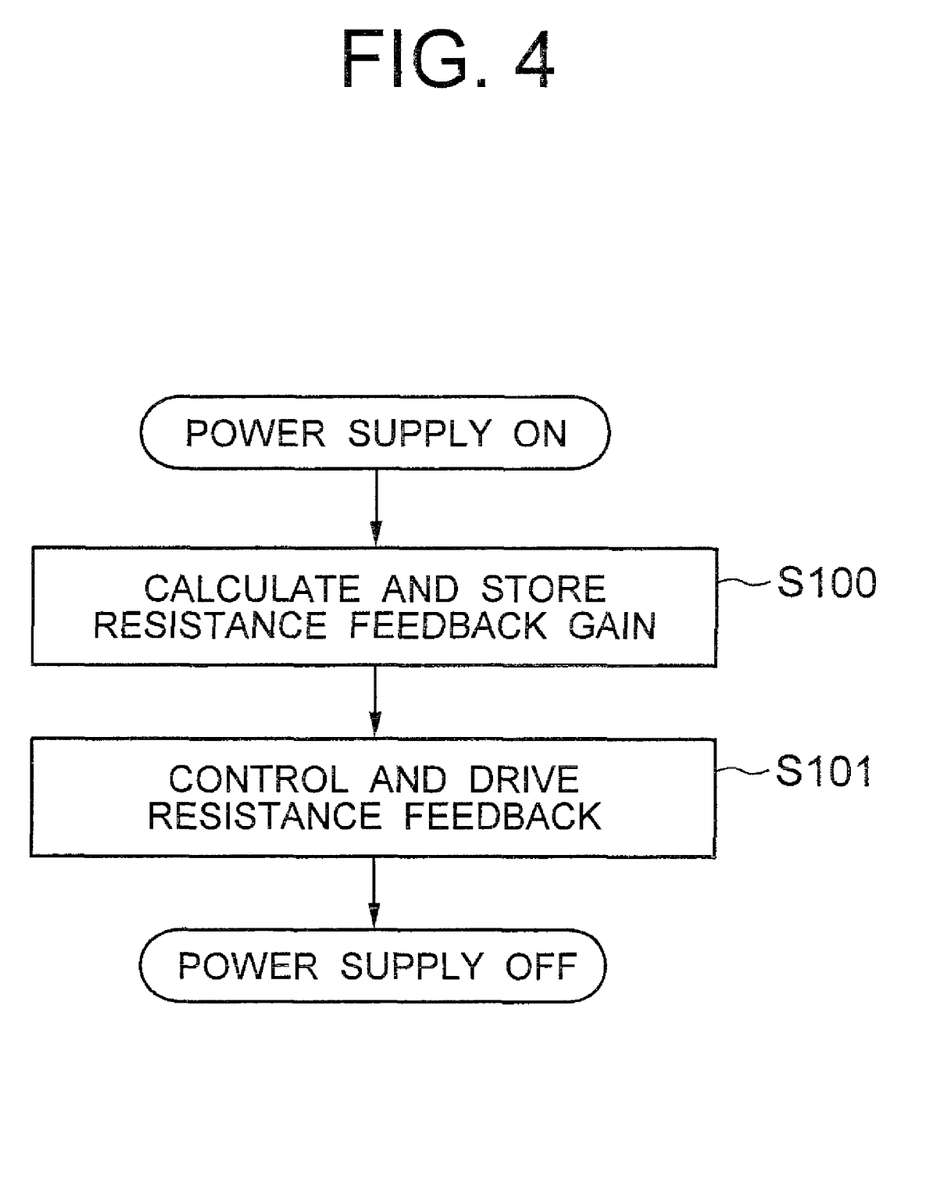
FIG. 4 is a flowchart explaining a procedure for a first control method carried out by the resistance feedback circuit at the time of starting a use, in the shape memory alloy actuator system according to the embodiment.

Calculating the amount of change in resistance ΔR when heated with the constant electric power at a constant interval Δt, for ΔR to reflect an amount of movement at interval Δt of the mobile object 12 shown in FIG. 2A and FIG. 2B, may become a factor which calculates the optimum feedback gain in which an external temperature environment and a friction between the mobile object 12 and the cylinder 11 are taken into consideration. As shown in FIG. 4, by carrying out a resistance feedback gain calculation storage (step S100) at the time of each drive, and carrying out a resistance feedback control drive (step S101) by the resistance feedback gain calculated, it is possible to carry out a stable drive.

Next, a procedure for a first control method carried out by the resistance feedback circuit 20 will be described below by using FIG. 4. Here, FIG. 4 is a flowchart explaining the procedure of the first control method carried out by the resistance feedback circuit at the time of starting the use, in the shape memory alloy actuator system 100 according to the embodiment.

In the shape memory alloy actuator system 100 according to the embodiment, at the time of putting the power supply ON, the abovementioned resistance feedback gain calculating storage (steps from S1 to S14 in FIG. 3) (step S100 in FIG. 4) is started. The optimum resistance feedback gain is calculated and stored, and a resistance feedback control drive is carried out by using the resistance feedback gain stored in a resistance feedback control drive (step S101) at a subsequent step. Accordingly, at the time of carrying out the drive at step S101, since the drive is carried out by using the feedback gain calculated immediately before the drive, a stable drive becomes possible.

Figure 5:
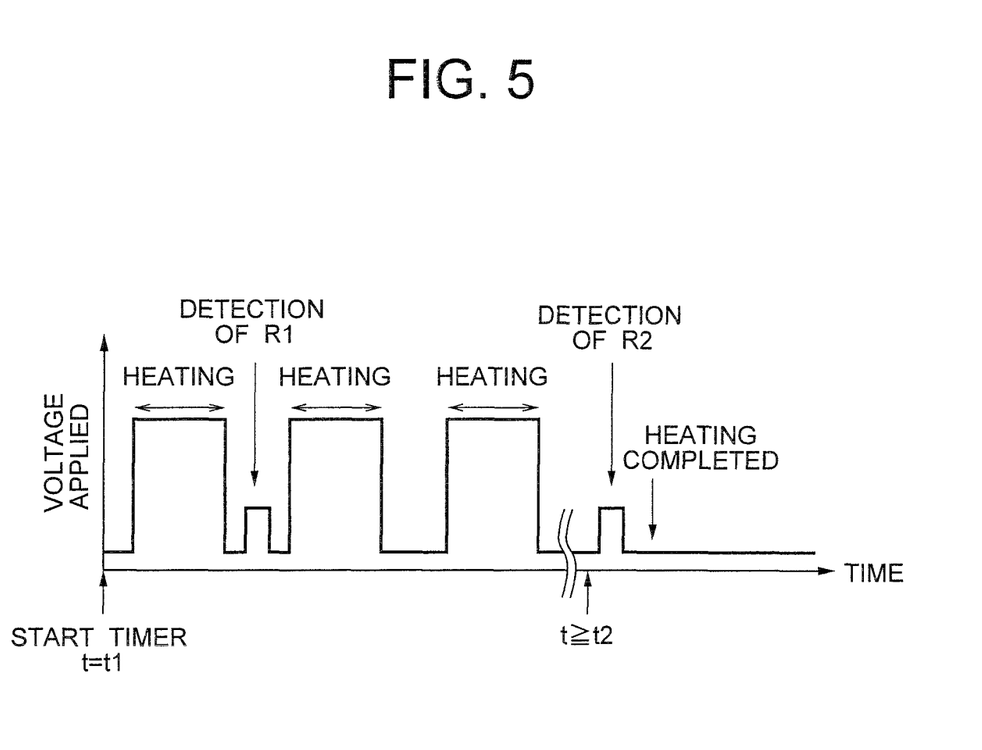
FIG. 5 is a timing chart of the resistance feedback gain calculation storage shown in FIG. 3 and FIG. 4.

FIG. 5 is a timing chart of the resistance feedback gain calculation storage shown in FIG. 3 and FIG. 4. A horizontal axis shows time and a vertical axis shows a value of a voltage which is to be applied to the SMA wire 16 shown in FIG. 2A and FIG. 2B. A timer shown in FIG. 3 is let to be an origin (starting point) when t=t1 (step S3). The voltage to be applied to the SMA wire 16 is divided into a voltage pulse for heating and a voltage pulse for detecting a resistance. In the embodiment, the voltage pulse for heating is indicated by a value greater than the voltage pulse for detecting the resistance. The resistance value of the SMA wire 16 detected as R1 (steps S4 and S5 in FIG. 3) after heating immediately after the timer is started is shown in FIG. 5. When time t is t2 or more than t2, the resistance value of the SMA wire 16 is detected as R2 (steps S7 and S8 in FIG. 3). After detecting the resistance, the heating is terminated (step S9 in FIG. 3). Thereafter, although it is not shown in the diagram, computation in which t1, t2, R1, and R2 are used is carried out (steps from S10 to S14 in FIG. 3).

FIG. 6 shows a structure of the shape memory alloy actuator system 100 shown in FIG. 2A and FIG. 2B, and a functional block diagram in which, inside of the resistance feedback circuit 20 which controls the drive is shown. The shape memory alloy actuator 10 is connected to a detection section 21 which detects the resistance of the SMA wire 16 in the shape memory alloy actuator 10 and an output section 22 which applies an electric power to the SMA wire 16 in the shape memory alloy actuator 10. A command section 23 outputs a command target value to a computing section 25, and the computing section 25 compares the command target value and the resistance value of the SMA wire 16 detected by the detection section 21, and carries out the resistance feedback control by which the optimum electric power is applied.

Moreover, when a control section 24 has output a command for carrying out the resistance feedback gain calculation storage to the detection section 21, the output section 22, and the computing section 25, the computing section 25 stops the resistance feedback control once, and for the resistance feedback gain calculation storage, calculates ΔR from the detected values of R1 and R2 as shown in FIG. 3, and the calculation of Δt is carried out by a gain setting section 36 in the computing section 25 which will be described later, and outputs ΔR and Δt. The gain setting section 36 calculates value P which is a ratio of ΔR and Δt, from ΔR and Δt input, and estimates the optimum feedback gain from P, and outputs the optimum feedback gain to a storage section 27. The storage section 27 stores the optimum feedback gain which is input, and outputs to the computing section 25. The computing section 25 carries out the resistance feedback control drive by using the optimum feedback gain which is input.

Figure 9:
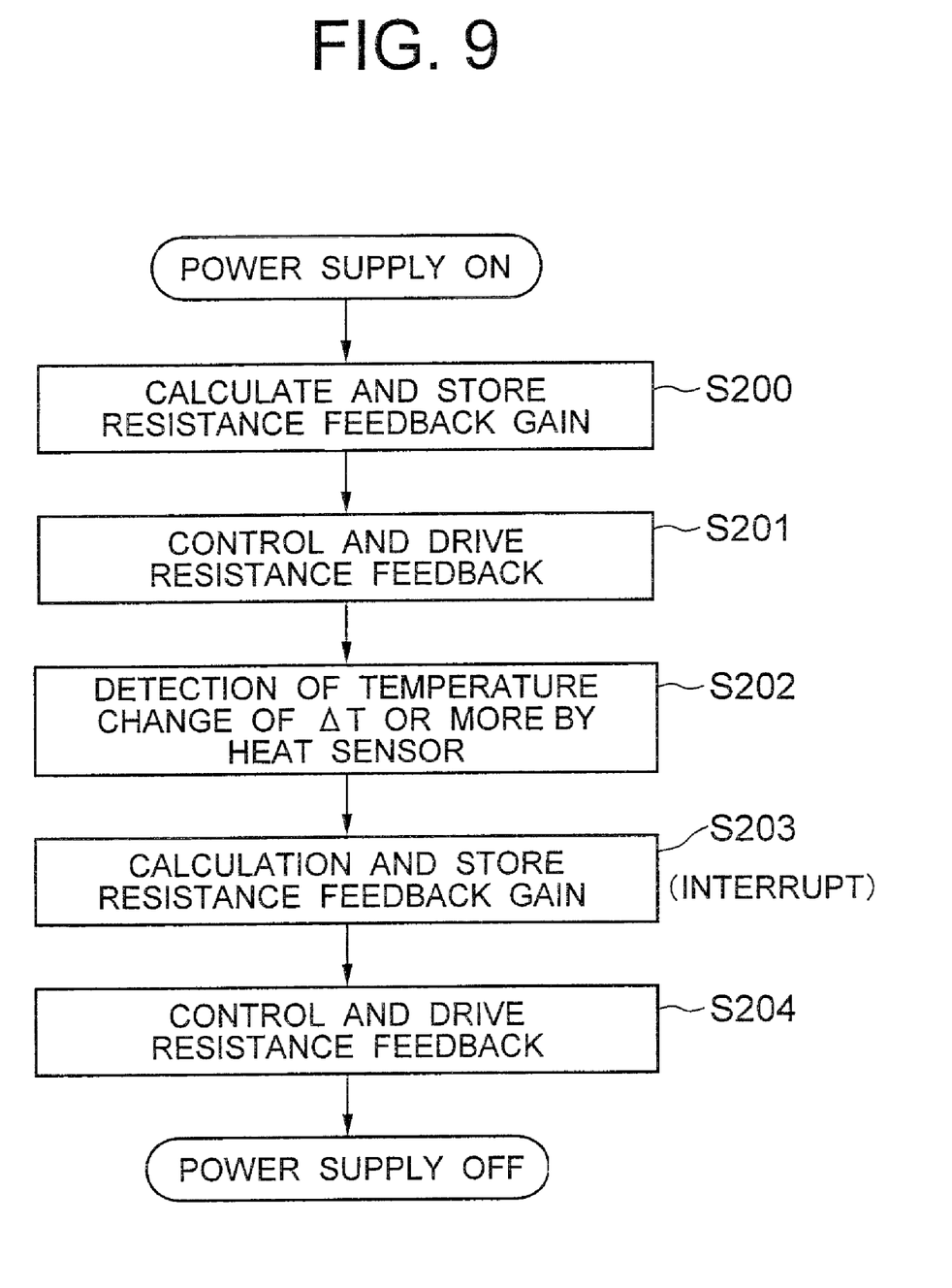
FIG. 9 is a flowchart explaining a procedure for a second control method carried out by a resistance feedback circuit at the time of starting a use, in the shape memory alloy actuator system according to the modified embodiment of the embodiment.

FIG. 7 is a functional block diagram showing a structure of a shape memory alloy actuator 200 according to a modified embodiment, in which, a heat sensor 28 (a sensor section) is added to the structure of the shape memory actuator system 100 shown in FIG. 6. FIG. 9 is a functional block diagram of an embodiment shown in a flow chart shown in FIG. 9. The heat sensor 28 detects an ambient temperature of the shape memory alloy actuator 10 or the shape memory alloy actuator system 100, and outputs the ambient temperature detected to the control section 24. When the control section 24 has detected that the ambient temperature detected by the heat sensor 28 is changed, the control section 24 outputs to the computing section 25 a command for carrying out the resistance feedback gain calculation storage.

FIG. 8 is an example of a block diagram shown regarding the computing section 25 in the shape memory alloy actuator system 100 according to the embodiment shown in FIG. 6. A command resistance value is input to the computing section 25 from the command section 23, and the resistance value of the SMA wire 16 is input by the detection section 21. The command resistance value and the resistance value of the SMA wire 16 which are input are input to a judgment computing circuit 31. The judgment computing circuit 31 compares the command resistance value and the resistance value of the SMA wire 16 and computes the optimum amount of electric power to be supplied such that the resistance value of the SMA wire 16 becomes the command resistance value. Thereafter, the judgment computing circuit 31 outputs the amount of electric power to be supplied to the output section 22, and supplies the electric power to the SMA wire 16 in the shape memory alloy actuator system 100 from the output section 22. When the command to estimate the optimum feedback gain has been made by the control section 24 to the computing section 25, the resistance value of the SMA wire 16 input from the detection section 21 is input to the gain setting section 36.

The gain setting section 36 stores abovementioned R1 and R2, and t1 and t2 which are time at which R1 and R2 are acquired in the storage section 27. The gain setting section 36, upon carrying out the computation of ΔR=R2−R1 and Δt=t2−t1 by using R1, R2, t1, and t2, estimates the optimum feedback gain from ΔR and Δt, and outputs to the storage section 27. The storage section 27 inputs the optimum feedback gain which is input, to the judgment computing circuit 31. Since the judgment computing section 31 is capable of carrying out the resistance feedback control with the optimum feedback gain in a state in which, a command has been made to estimate the optimum feedback gain by the control section 24, a stable drive becomes possible.

FIG. 9 is a flowchart explaining a procedure for a second control method carried out by the resistance feedback circuit 20 at the time of starting the use, in the shape memory alloy actuator 200 according to the modified embodiment of the embodiment shown in FIG. 7. At the time of putting the power supply ON, the resistance feedback gain calculation storage (step S200) shown in FIG. 3 is started, and the optimum resistance feedback gain is calculated and stored. Thereafter, the resistance feedback control drive is carried out by using the resistance feedback gain stored in the subsequent step resistance feedback control drive (step S201). Accordingly, at the time of carrying out the drive by using the feedback gain calculated immediately before the drive, a stable drive becomes possible.

When the heat sensor 28 shown in FIG. 7 has detected a rapid change in an external environment temperature (ambient temperature) of the shape memory alloy actuator 10 or the shape memory alloy actuator system 200 (step S202), the resistance feedback gain calculation storage (step S203) is started interrupting the resistance feedback control drive (step S201), and once again, the optimum resistance feedback gain is calculated and stored. Thereafter, the resistance feedback control drive (step S204) is carried out by using the resistance feedback gain which is stored. Accordingly, even when the ambient temperature of the shape memory alloy actuator 10 or the shape memory alloy actuator system 200 changes rapidly, since the control drive is carried out upon calculating the optimum feedback gain at that time, the stable drive becomes possible.

In the shape memory alloy actuator system 100 shown in FIG. 6, the interruption of the resistance feedback gain calculation storage (step S100 in FIG. 4) is only once. However, when the heat sensor 28 has detected the rapid temperature change, it may be carried out by interrupting every time. Moreover, even when the heat sensor 28 is not there, for instance, it is possible to achieve a similar effect by carrying out the resistance feedback gain calculation storage by interrupting at a predetermined time interval.

As it has been described above, the shape memory alloy actuator according to the present invention is useful for a size reduction and a weight reduction, and accordingly, is suitable for a size reduction and a weight reduction of an endoscope, a mobile telephone, a camera, and other electronic equipments.

A shape memory alloy actuator system according to the present invention shows the following effects. A resistance feedback circuit further includes a storage section which stores a feedback gain which is calculated in advance, a resistance value which is acquired from a detection section, and a time at which the resistance value is acquired, and a computing section includes a gain setting section which calculates an amount of change in the resistance value in a predetermined time from the resistance value and the time stored in the storage section, and calculates the feedback gain based on the change in the resistance value calculated, and replaces the feedback gain which is calculated in advance. According to such structure, it is possible to use the optimum feedback gain which copes with a position controllability and a response speed of a mobile object coupled with a shape memory alloy, and other characteristics, and a change in a use environment of an actuator. Accordingly, it is possible to let a control of a shape memory alloy actuator to be an appropriate control all the time.

What is claimed is:

1. A shape memory alloy actuator system comprising:
a shape memory alloy actuator which moves a mobile object installed on a shape memory alloy wire by making the shape memory alloy wire contract by heating by supplying an electric power at a time of heating, and by making the shape memory alloy wire elongate by a bias applying member to which bias is applied, resisting in a direction of contraction at a time of cooling; and
a resistance feedback circuit, wherein
the resistance feedback circuit includes a detection section which detects a resistance value of the shape memory alloy wire at the time of contraction and elongation of the shape memory alloy actuator, a computing section which carries out a comparison operation of comparing a resistance value obtained from the detection section with a resistance value input by a command section, and calculates a value of an electric current to be applied according to the resistance value which is detected, an output section which outputs to the shape memory alloy actuator the value of the electric current applied which is output from the computing section, a control section which controls the detection section, and the computing section, and the output section, and
the resistance feedback circuit further includes a storage section which stores a feedback gain which is calculated in advance, a resistance value which is acquired from the detection section, and a time at which the resistance value is acquired, and
the computing section includes a gain setting section which calculates an amount of change in the resistance value in a predetermined time from the resistance value and the time stored in the storage section, and calculates the feedback gain based on the change in the resistance value calculated, and replaces the feedback gain which is calculated in advance.

2. The shape memory alloy actuator system according to claim 1, wherein the feedback gain which is calculated in advance is calculated based on a change in the resistance value in the predetermined time which is acquired at a time of manufacturing the shape memory alloy actuator system.

3. The shape memory alloy actuator system according to one of claims 1 and 2, wherein the gain setting section calculates the feedback gain based on a change in the resistance value in the predetermined time which is acquired at the time of putting ON a power supply of the shape memory alloy actuator.

4. The shape memory alloy actuator system according to one of claims 1 and 2, wherein the feedback gain setting section sets the feedback gain at a predetermined time interval after putting ON a power supply of the shape memory alloy actuator.

5. The shape memory alloy actuator system according to one of claims 1 and 2, further comprising:
a sensor section which detects an ambient temperature of the shape memory alloy actuator, wherein
when a temperature change portion detected at the predetermined interval by the sensor section, after putting the power supply ON, is beyond a predetermined temperature range, the feedback gain setting section calculates the feedback gain.

* * * * *